United States Patent [19]

Guay

[11] Patent Number: 4,553,351
[45] Date of Patent: Nov. 19, 1985

[54] METHOD OF TREATING A SOIL

[75] Inventor: R. Edgar Guay, Sillery, Canada

[73] Assignee: Ministere de l'Energie et des Ressources, Quebec, Canada

[21] Appl. No.: 473,253

[22] Filed: Mar. 8, 1983

[30] Foreign Application Priority Data

Jul. 21, 1982 [CA] Canada .................................. 407735

[51] Int. Cl.$^4$ ........................ A01B 79/00; A01G 1/00
[52] U.S. Cl. ............................................ 47/58; 47/9; 71/11; 111/1
[58] Field of Search ........... 111/1; 47/1, 58, DIG. 10, 47/9; 71/12, 13, 21, 22, 23, 25

[56] References Cited

U.S. PATENT DOCUMENTS

| | | | |
|---|---|---|---|
| 354,983 | 12/1886 | Jullien | 71/21 |
| 2,035,286 | 3/1936 | Wenzel | 71/21 |
| 2,951,753 | 9/1960 | Groves | 47/9 |
| 2,995,434 | 8/1961 | Burton | 47/DIG. 10 |
| 3,353,948 | 11/1967 | Sroda | 71/23 X |
| 3,561,943 | 2/1971 | Gay et al. | 71/23 X |
| 4,041,271 | 3/1977 | Rohlf et al. | 111/7 |
| 4,253,273 | 3/1981 | Rees et al. | 47/DIG. 10 |

*Primary Examiner*—James R. Feyrer
*Attorney, Agent, or Firm*—Robic, Robic & Associates

[57] ABSTRACT

Method of treating a soil particularly for maintaining or increasing the percentage of organic matter therein. This method which is carried out by simple surface composting, after spreading shredded forest residue and animal manure, is very interesting in that it associates the use of an agricultural technique known for its simplicity and low cost with the use of two basic materials produced each year in enormous quantities as industrial by-products for which no disposal means have been found.

6 Claims, No Drawings

METHOD OF TREATING A SOIL

The present invention relates to an improved method for treating a soil by surface composting particularly for maintaining or increasing its percentage of organic matter.

Surface composting is an agricultural technique which has been known for quite some time and which resides essentially in incorporating, in the superficial layer of the soil to be treated, a fresh organic matter so that it may decay. This technique is based on the principle that the microbial life in the soil, which is reactivated by plowing, transforms the organic matter incorporated in the soil into organic matter useable by plants.

If this technique is known and offers certain advantages, it seems however that it has not been exploited very much. In fact, it even seems that no particular methodology has ever been developed for its practice although, in most cases, the organic matter is applied to the soil by means of a manure spreader and is thereafter incorporated into the same soil by means of a harrow or by a plow depending upon the desired depth of incorporation.

In spite of this lack of methodic research in this field, it is nevertheless known that the quality of the result obtained by surface composting is intimately related to the depth at which the fresh organic matter is incorporated into the soil. It has indeed been noted that the incorporation of organic matter by surface composting in the superficial layer of the soil, that is to a depth smaller or equal to 10 cm, makes it possible to preserve the humidity which is required by the growing plant while providing it with an aeration sufficient to stimulate biological activity and to accelerate the decaying mechanism. The direct results of this incorporation at a small depth are, on the one hand, that it decreases the influence of a selective period of the year in which to proceed with composting and, on the other hand, that it results in a substantial increase in the yield of subsequent crops carried out in the treated soils.

It is also known that surface composting has a certain number of advantages and disadvantages which, for most of them, come more from the addition of fresh organic matter in the soil than in the manner of applying this fresh organic matter.

Amongst the disadvantages of surface composting, there is the inherent risk to cause immobilization of nitrogen in the soil or even a deficiency of this element if the proportion of carbon with respect to nitrogen (hereinafter called C/N ratio) is not adjusted and becomes too high. This immobilization which can happen in two ways—direct incorporation of nitrogen in the microbial cells or by association with compounds formed during decay as for example phenols—generally causes a substantial decrease in crop yield.

Another disadvantage of surface composting that may be mentioned is the loss of other nutritive elements which may happen under bad climatic conditions (too much or too little rain), caused by an insufficient decay of the fresh organic matter. This bad decay is itself due to a deficiency in oxygen or to an excess of carbonic gas caused by too great a respiration of the microorganisms as well as to an excess of ammonia or other gases. This bad decay may also lead to immobilization of phosphorous.

Finally, two other inconveniences of surface composting that may be cited are the transmission of pathogenic germs and diseases and the propagation of weeds which may be caused by the incorporation of fresh organic material which creates an ideal multiplication medium for the various ennemies of crops by providing them with food and improving their growth and survival. The phytotoxic effects of the fresh organic matter incorporated in the ground are more particularly active at the beginning in the first phases of decomposition and decrease with time. The toxicity depend of course on the nature of the substrates to compost and is not the same for all, depending also on the maturity of the vegetable tissues. Nevertheless, it has been observed that the depth of incorporation had a great importance on the formation and the action of phytotoxics.

In spite of these inconveniences, surface composting offers advantages.

The first of these advantages comes from the fact that the fresh organic matter is intimately mixed with the soil during composting. Thanks to this intimate mixture, the soil influences the degradation and humidification processes whereas the decaying organic matter influences the soil by allowing the formation of aggregates. During the intensive microbial activity which follows the application of the organic residues to the soil, the microbial cells and filaments may indeed machanically link the soil particles together and thus improve the nature and the <<work>> of the thus treated soil.

A second advantage accompanying surface composting results from minimizing the losses in food elements due to washing of the free cations resulting from the increased formation of links between the organic matter and the metal ions.

Two other advantages connected to surface composting are, on the one hand, the fixation of improved nitrogen particularly by the leguminous plants as well as the improved assimilation of phosphorous by the crops due to a gradual conversion of the little active phosphorous into an available form under the effect of acid products resulting from the decomposition of the cellulose and of humic compounds which are chelate compounds having a dissolving action.

Finally, a last major advantage connected to surface composting resides in the simplicity of operations which are limited to crushing, if need be, of the organic matter to compost, to its spreading and its mixing to the superficial layer of the soil. If the debris are well shredded and are incorporated to the soil superficially only, no human intervention is necessary to, for instance, air the soil by means of stirring or rotating devices as is the case in other techniques for improving the soil such as the composting technique by piling.

To resume, it does appear that surface composting offers, to the extent that it can be used, the great interest of being far more economical than any other type of soil improvement methods because of the very restricted manipulation that it requires and the simplicity with which it can be carried out if one takes into consideration that it immediately takes advantage of the soil, the bacteria and the oxygen of the air.

As every one knows, larger and larger quantities of forest residue are produced each year throughout the world and namely in Quebec in most of the agricultural regions, the residue being in the form of wood chips, tree limbs, leaves, bark or brushwood. These forest residues which are known to be rich in mineral salts, oligo elements, proteins and organic matter are usually stocked into dumps or are burned. Thus, for instance, the province of Quebec has brush wood chips by the tens of thousands of tons in dumps at Quebec City, Trois-Rivières and Montreal. Each year, cities and towns and big public utility companies such as Bell Canada or Hydro-Quebec cut trees, clear out areas for hydro-electric or telephone lines, look after parks and lawns thereby adding thousands of tons to the already accumulated quantities.

Private industry likewise produces brushwood chips by the tens of thousands each year. Thus, by way of example, plants extracting the oil needed to produce, in the province of Quebec, pine, spruce and cedar oils also reject stacks of tree limb and foliage residue for which they have no use. Similarly, shredders used in the paper industry produce, at the level of their separator, leaves, small tree limbs and roughly shredded barks. The quantity of residue which is thus rejected by each of the shredders represents about 6% in weight of the commercial chips obtained which are stacked in the forest where the trucks are loaded.

On the other hand, it is also known that enormous quantities of liquid manure rich in nitrogen are produced each year, namely by swines in stock farms, the farmers not knowing what to do with it and which, in certain cases, finally end up in brooks or rivers.

An object of the present invention lies in the provision of a method for treating soils by surface composting from forest residue in the form of chips or shredded brushwood and liquid manure, namely swine manure.

It is consequently an object of the present invention to provide a method of treating soil which associates, on the one hand, an agricultural technique known for its simplicity and low cost with, on the other hand, the use of two basic materials available each year in enormous quantities as industrial byproducts for which no means of disposal is known.

The method of treating soils by surface composting starting with shredded forest residue and liquid manure according to the invention makes it possible, by the choice of the raw material which is used, to avoid most of the aforementioned disadvantages directly related to the surface composting technique. Indeed, the use of liquid manure particularly rich in nitrogen in combination with shredded forest residual products particularly rich in organic matter and mineral salts makes it possible to obtain a mixture of which the carbon to nitrogen ratio is sufficiently well adjusted to prevent a deficiency in nitrogen and an eventual immobilization of that element. The presence of liquid manure makes it also possible to give the soil additional nutritive elements such as nitrogen or $P_2O_5$ and $K_2O$.

Further to allowing to take advantage of forest residual products and liquid manure for which there is presently no use, the method of treating soils according to the present invention has the great advantage to ensure a stable and even an increase in the percentage of organic matter in the treated soils, percentage which tends to gradually decrease with time and which results in a decrease in observed crop yields.

The method of treating soils by surface composting according to the invention comprises of course the three basic steps for this type of agricultural technique, that is:

(a) plowing the soil to be treated;
(b) spreading of fresh organic matter, and
(c) harrowing of the soil to incorporate the fresh organic matter at a depth which is relatively small, being selected for, on the one hand, taking advantage of the various advantages mentioned above which are intimately connected to the depth of incorporation of the compost in the ground when this depth is small and, on the other hand, reducing to a maximum the transmission of pathogens and diseases, the incorporation of compost in the superficially layer of soil having indeed proved less toxic than that at a greater depth.

According to the invention, the above-described method of treating soils is however characterized in that, on the one hand, use is made of shredded forest residual products as fresh organic matter and, on the other hand, a liquid manure is spread over the shredded forest residue after the latter has been spread over the soil but before it is harrowed.

The quantity of shredded forest residual products that may be spread over the soil is not very critical and rather depends on the facility of mixing it in the superficial layer of soil and its toxicity which depends on their nature and their age; young vegetable tissues appearing to be more efficient. Generally, the shredded forest residual products will be spread in a quantity smaller or equal to 6000 cubic feet per acre per season. Preferably, spreading will be uniform to permit a better aerobic fermentation of the plowed soil.

As forest residue, wood chips resulting from the delimbing of trees in parks, streets or beneath electric and telephone energy distribution lines may be used. Other products that can be used are brushwood chips obtained as residual products from plants wherein essential oils are extracted or from paper pulp plants or any other place where wood shredders are used. The size that the chips or brushwoods must have is not a critical point of the invention. However, the speed of decomposition of the chips or brushwoods varying as a function of the size of vegetable fragments, it is obvious that reducing their size will facilitate them being worked by microorganisms. It is appropriate to note however that if the chips are too finely broken up, they may then compact.

The selection of the liquid manure used as well as the quantity spread over the shredded forest residual products is not critical to the invention. It will however be preferable to use swine manure because of its advantageous mechanical composition and the difficulty existing presently of getting rid of this type of liquid manure in particular. Can also be used, liquid manure and/or hen, cattle, poultry manures or any other type of residual products rich in proteins, such as residue from the treatment of milk or sewage from meat treating plants.

The quantity of liquid manure to use depends on the quantity of incorporated chips and the content in carbon and in nitrogen in the chips and in the liquid manure. Indeed, the addition of liquid manure rich in nitrogen to chips is essentially intended to lower the C/N ratio of the mixture, very high in the case of the chips alone. Preferably, this ratio will be decreased to a value lower or equal to 30/1. During the process of transformation of the organic matter, this ration C/N tends progressively to decrease until it comes in equilibrium with the ratio C/N of the microorganisms which are comprised between 5 and 15, and more generally very close to 10. The use of liquid manure in a quantity sufficient initially to bring the ratio C/N of the mixture spread over the soil to a value lower than 30/1, thus makes it possible to reach a final ratio having a value sufficiently low to prevent immobilization of nitrogen which would be detrimental to the crops. Preferably however, the spread quantity of swine manure will have to be kept lower or equal to 15 tons per acre per season, to avoid serious pollution problems caused by surface running towards furrows or ditches and hence towards brooks and rivers.

Similarly, the liquid manure will preferably be uniformly spread to ensure a homogeneous C/N ratio.

It is to be noted that mixing the liquid manure with the residual forest products and the soil has the advantage of appreciably reducing the smell of the manure which constitutes an additional advantage of the method according to the present invention.

To take advantage of the above-mentioned various advantages, as inherent to surface composting carried out at low depth, the harrowing step of the process according to the invention will be obtained with a spring harrow of which the working depth into the soil will be adjusted in such a manner as to be smaller or equal to 10 cm. Preferably, the working depth of the harrow will be adjusted to 5 cm. The reason for preferably using a spring harrow rather than a disk harrow resides in the fact that the latter may have a tendency to <<float>> over forest residual products contrary to the spring harrow. Nevertheless, it will be understood that any other means making it possible intimately to mix the forest residue and the liquid manure with the superficial layer of soil can be suitably used provided that the desired result, that is an intimate mixture, be obtained.

The treatment of the soils in the manner taught by the present invention can be made at the beginning, in the middle or at the end of a season. Preferably however, the treatment is made at the end of the season or, in other words, in the fall after harvesting.

Because of the use of chips and of liquid manure as taught by the method of the present invention, it is possible to add to the soil not only organic matter but also an interesting array of oligo elements and thus avoid loss of crops because of the time lost by fallowing to which some farmers must presently resort.

The steps of the method according to the invention are extremely simple and economical to carry out. Indeed, the shredded residual forest products can be spread with an ordinary manure spreader and then the mixture of the forest residue and the liquid manure into the soil can be achieved with a spring harrow of conventional type.

The addition of organic matter into the soil obtained by the soil treatment method according to the invention advantageously improves the agglomeration into the soil and influences the hydraulic conductivity of the same soil. In this respect, it is appropriate to mention that the use of green and fresh brushwood chips appears to give the soil a better texture and the reason appears to be in an increased production of colloidals. Furthermore, the organic matter which is incorporated into the soil gives it a deeper hue which favors the absorption of heat thereby providing a more important warming up in the spring. Besides, certain types of chips of residue from the extraction of essential oil have shown to drive away crop insects. As a consequence, the appropriate use of certain types of shredded forest residue could prove interesting to combat insects and this in a natural manner.

The application of the method according to the present invention as well as its numerous advantages will come out better from reading the following test reports.

TEST NO. 1

At the beginning of a summer, an acre of land located in the region of Quebec city has been treated by spreading over the freshly plowed soil about 1 100 cubic feet of chips coming from the shredding of tree limbs having green leaves, limbs cut by Hydro-Quebec employees during site clearing for distribution and electric lines of the city of Quebec. The thus spread chips were sprinkled with hen and swine liquid manure at the rate of about 2000 gallons and the thus sprinkled chips were mixed with the soil with a Graham harrow adjusted to a working depth of 5 cm.

After this treatment of the soil, barley (oyola) and oat were sowed.

Although the summer was very dry, no difficulty affected the treated parcel of soil on account of the drought. 47 days after sowing, that is in the first days of September, the field was plowed at the time when the grain was starting to head. At the beginning of October, samples were taken of the soil that had been treated and of an adjacent soil that had not been treated, and analyzed. This analysis has shown that the field that was treated had a quantity of organic matter of 5.9% compared to a quantity of 4.2% found in the natural state in the non-treated soil (an increase of 40%). The soil pH had changed slightly but the ratio C/N remained always good. This analysis has also shown that the quantity of potassium, calcium and magnesium had increased. During this first test, all types of observations have been made. Thus, it has been noted that the brushwood chips spread very well with a manure spreader. It has also been noted that the smell of liquid manure practically only lasted during the time it took for spreading, harrowing and sowing. The liquid manure did not tend to flow away or run over the soil. Furthermore, it has been noted that the treated soil, although located where some rock surfaces, resisted the drought very well.

All of these results were obtained at an extremely low cost, smaller than $150.00 per acre, including the operating cost of the machinery and the transportation cost of the chips.

This acre of land treated in summer responded very well to a barley culture the following summer. By way of example, it may be mentioned that the oat stalks topped by several inches the stalks of the oat planted in the nearby comparison lot and that many cobs had 50 corns and more whereas in the neighboring non-treated soil, the cobs only had 30 to 32 corns as an average. A bit of beat down was however noted in the treated lot where some ill-shredded chips, for example bits of limbs having 12 to 15 cm in length and 2 cm in diameter, had escaped composting.

After having noted that the treatment made to the land had favored a better yield while improving the structure of the soil, other analyses were made after the harvest. These analyses have shown that the percentage of organic matter had held at 5.99% and that the pH had retained a good level.

The following year, the same acre of land that was treated two years previously gave a second good harvest and the analysis of the soid did not show any decrease in the percentage of organic matter. To the contrary, the percentage shot over 6%, as shown by the table that follows giving comparative results of analyses carried out on an acre of land treated in a conventional way and an acre of land treated according to the invention.

|  | REFERENCE FIELD | TREATED FIELD |
|---|---|---|
| *O.M % | 5.43 | 6.02 |
| pH | 6.02 | 6.48 |
| C | 3.15 | 3.49 |
| C/N | 14.3 | 14.0 |
| N % | 0.22 | 0.25 |
| P Kg/ha** | 273 | 277 |
| K Kg/ha | 404 | 482 |
| Ca Kg/ha | 5865 | 7638 |
| Mg Kg/ha | 292 | 342 |
| Mn Kg/ha | 6.05 | 6.05 |

*% of organic matter
**hectare = 2.47 acres

TEST NO. 2

On the same farm than that where the preceding test was made, another field of three acres adjacent the preceding treated field was covered with about 3000 ft$^3$ of brushwood chips having already slightly started to compost. Indeed, the leaves had already disappeared and the chips had blackened and were warm at the time of spreading. After this first spreading, swine liquid manure was in turn spread to activate composting of the chips. The results obtained were as interesting as those obtained in the case of test 1.

The following year, the thus treated soil as well as the soil of an adjacent reference field were analyzed and the results are given in the table that follows.

|  | REFERENCE FIELD | TREATED FIELD |
|---|---|---|
| *O.M % | 3.63 | 4.16 |
| pH | 6.48 | 6.36 |
| C | 2.11 | 2.41 |
| C/N | 16.8 | 12.8 |
| N % | 0.12 | 0.19 |
| P Kg/ha | 686 | 651 |
| K Kg/ha | 714 | 843 |
| Ca Kg/ha | 5936 | 6314 |
| Mg Kh/ha | 285 | 211 |
| Mn Kg/ha | 6.05 | 6.05 |

*% of organic matter

TEST NO. 3

On another farm located in Quebec region, 3000 ft$^3$ of the same brushwood chips as those used for test no. 2 were spread on a three-acre lot. Before spreading, the field that had carried a strawberry crop was plowed. The spread brushwood chips were thereafter covered with hen manure and the whole harrowed to a depth smaller than 10 cm, before sowing oat.

By the middle of September, the three acres of oat thus planted had shown a remarkable vegetable strength and the yield obtained was excellent.

More than a year later, although the field was replanted with strawberries, a soil analysis was made and the comparative results obtained are illustrated in the following table.

|  | REFERENCE FIELD | TREATED FIELD |
|---|---|---|
| *O.M % | 2.59 | 4.25 |
| pH | 5.52 | 5.47 |
| P Kg/ha | 372 | 315 |
| K Kg/ha | 482 | 421 |
| Ca Kg/ha | 4915 | 4730 |
| Mg Kg/ha | 120 | 110 |
| Mn Kg/ha | 6.05 | 6.05 |

*% of organic matter

TEST NO. 4

On a sandy mound which had not been cultivated for about thirty years in the region of the city of Quebec, 3000 ft$^3$ of the same brushwood chips as those in test no. 2 were spread then covered with swine manure. The soil thus treated was thereafter harrowed to a depth smaller than 10 cm and oat sowed near the middle of the summer.

By the middle of September, it was noted that the soil had begun to change color and that the oat had started to grow. The plantlets of oat were however short, yellowish and the tip of the leaves dried, probably as a result of frost.

By mid-October, it was noted that the oat was nevertheless continuing to grow and was getting a beautiful dark green color, that its leaves had a width of 2 cm and that the oat plants measured from 30 to 35 cm in height. Only the tips of the leaves had traces of the frost of the preceding month.

As for the soil, it was softer to the touch and richer in organic matter.

The following year, the same field was plowed by a Rotovator at the end of May and potato plantlets were put into place. Soon vigorous young plants started to appear and the harvest was excellent. Some rough chips were noted that had escaped the moisture process but had however become brittle and easily friable. An analysis of the soil was carried out in the fall and comparative results obtained which are given in the following table.

|  | SAMPLE TAKEN FROM A FALLOW BENEATH THE FENCE | TREATED FIELD |
|---|---|---|
| *O.M % | 5.87 | 6.02 |
| pH | 4.20 | 4.62 |
| P Kg/ha | 33 | 279 |
| K Kg/ha | 181 | 757 |
| Ca Kg/ha | 1426 | 2411 |
| Mg Kg/ha | 85 | 171 |
| Mn Kg/ha | 6.05 | 6.05 |

*% of organic matter

TEST NO. 5

At the same farm where tests nos. 1 and 2 above had taken place, a portion of an acre was treated by spreading 6000 ft$^3$ of brushwood chips with 3800 gallons of hen liquid manure. The chips and the manure were then mixed with the soil by means of a Graham harrow operating at a working depth of 5 cm. Because of the size of the brushwood chips, a hardly avoidable accumulation of chips took place along the curves made by the machines. Nevertheless, the whole was sowed with oat.

Where the mixture had been appropriately achieved, the oat grew with an unexpected vigor. Several cobs were noted with 50 corns or more. Where the mixture had been incompletely made, the oat cobs grew well enough but yellowed. Lacteous comestible mushrooms appeared in these yellow spots and did so well in accelerating degradation of the chips that by the end of the season, it could be considered that the 6000 ft³ of chips had been digested by the soil.

Considering the difficulties met during harrowing, the crop of oat usually obtained went from 2000 to 1500 pounds in this part of land but the results of the test showed however that the soil contained 10.9% of organic matter enriched with mineral salts contrary to the percentage of 3.2% of organic matter that the same field had prior to being treated.

It seems that the bacteria and mushrooms that were formed had effectively transformed more than an important mass of green fertilizer. With a somewhat finer granulation of the chips and a better mixture with the first 5 cm of soil, a crop of more than 2000 pounds of corns could easily have been obtained.

On the other hand, the tests have shown that the soil of the thus treated acre had become similar to mapletree <<muld>> loaded with colloids and that its slightly acid pH had risen up to 7.2 at certain locations. The results of these tests are given in the following table.

|  | REFERENCE FIELD (ANALYSIS IN APRIL) | TREATED FIELD (ANALYSIS IN OCTOBER) |
|---|---|---|
| *O.M % | 3.2 | 10.9 |
| pH | 6.9 | 6.33 |
| P Kg/ha | 263 | 456 |
| K Kg/ha | 430 | 603 |
| Ca Kg/ha | — | 7537 |
| Mg Kg/ha | 114 | 235 |
| Mn Kg/ha | — | 6.05 |

*% of organic matter

The results obtained by the treatment method applied to this field have thus proved to be clearly positive and show the capacity of a soil of the sandy loam type to regenerate itself when brushwood chips sprinkled with liquid manure are used.

TEST NO. 6

On the same farm as that where test no. 4 took place, a lot of 1.3 acre was treated in the same manner as previously with 1500 ft³ per acre of brushwood chips sprinkled with swine liquid manure. The chips and manure were introduced into the soil with a harrow at a depth of 5 cm and potatoes were planted.

After a while, the mixture chips/liquid manure/soil proved to be excellent as the color of the potato plants showed a beautiful dark green.

By way of comparison, a lot adjacent to the preceding one was treated with 3000 ft³ per acre of brushwood chips sprinkled with swine manure and then sowed in the same manner with potatoes, after harrowing.

The results of the soil analyses carried out in October on the two fields treated as indicated previously are reported in the table below which can be compared with interest to the table previously given with respect to test no. 4 relating to results obtained on the same farm.

|  | FIELDS TREATED WITH | |
|---|---|---|
|  | 1500 ft³ | 3000 ft³ |
| *O.M % | 6.32 | 5.70 |
| pH | 5.09 | 5.67 |
| P Kg/ha | 194 | 1197 |
| K Kg/ha | 387 | 1264 |
| Ca Kg/ha | 3863 | 5144 |
| Mg Kg/ha | 171 | 281 |
| Mn Kg/ha | 6.05 | 6.05 |

*% of organic matter

As the above table shows, the percentage of organic matter in the fields treated on this farm raised to 6%, which represents an average increase of 100% if compared with the average percentage of organic matter measured in the other fields of this farm. As can also be noted, the improvement of this soil in mineral salts was very important.

From the point of view of yield, the stalks of the potato plants planted in the treated fields measured more than 70 cm. The space between the rows had disappeared and the wood at the base of the stalks had a surprising diameter of 2.5 cm. At harvest, in the last days of July and the first days of August, the tubers that were obtained proved to be of the jumbo quality and the yield was 285 fifty-pound bags per acre.

TEST NO. 7

On the same farm where test no. 3 took place, two other lots were treated according to the same technique as previously described with respect to test 4.

On the first of the two lots, 3000 ft³ of brushwood chips were spread and sprinkled with hen manure then harrowed with the soil at a depth of approximately 5 cm.

In the other lot, 1500 ft³ of brushwood chips were spread with a corresponding quantity of hen manure and the whole were harrowed with the soil at a depth of 5 cm.

The two lots thus treated were strawberry planted. It is pointed out here that certain difficulties were met in operating the planting machine with the lot treated with 3000 ft³ of chips per acre because the chips were too big.

During the summer, the flowering was abundant and it could be noted that the feet of the plants were very strong, of a deep brown color and provided with suckers having a diameter of from ⅛ to 3/16 inch which augured a very good strawberry crop. In September, no ripening or slowing down of the growth was noted. In fact, ripening of the suckers could not be observed until the end of October when the strawberry plantation was protected with straw. The results of the soil analyses carried out on these two parcels of land in October 1980 are given hereinbelow. These results are to be compared with the results previously obtained in test 3.

|  | FIELDS TREATED WITH | |
|---|---|---|
|  | 1500 ft³ | 3000 ft³ |
| *O.M % | 4.72 | 4.50 |
| pH | 5.16 | 5.38 |
| P Kg/ha | 427 | 370 |
| K Kg/ha | 723 | 568 |
| Ca Kg/ha | 3137 | 4171 |
| Mg Kg/ha | 254 | 219 |
| Mn Kg/ha | 6.05 | 6.05 |

*% of organic matter

The embodiments of the invention in which an exclusive property or privilege is claimed are defined as follows:

1. In a method of treating a soil by surface composting, particularly for maintaining or increasing the percentage of organic matter in the soil, said method being of the type wherein the soil to be treated is first plowed, then spread with a fresh organic matter and thereafter harrowed to incorporate the organic matter into the soil at a shallow depth, the improvements wherein:

a layer of shredded forest residual products selected from a class consisting of wood chips and shredded brushwood is uniformly spread over the surface of said plowed soil;

an effective amount of liquid manure is spred uniformly over the shredded forest residual products after they have been spread over the soil but before the soil is harrowed; and the amount of liquid manure uniformly spread over the shredded forest residual products is sufficient to obtain a mixture having an homogeneous carbon to nitrogen ratio not exceeding 30:1 whereby harrowing said shredded forest residual products in admixture with said liquid manure into the soil to said shallow depth causes decomposition of the admixed forest residual products and manure concomitant to the growing of a crop.

2. The improved method of claim 1, wherein the shredded forest residual products are spread in a quantity not exceeding 6000 $ft^3$ per acre per season.

3. The improved method of claim 2, wherein the shredded forest residual products are admixed and incorporated uniformly to ensure a better aerobic fermentation of the admixed materials within the plowed soil.

4. The improved method of claim 3 wherein said liquid manure is swine manure and said swine manure is spread in a quantity not exceeding 15 tons per acre per season.

5. The improved method of claim 3, wherein the incorporation of the organic matter into the soil is made with a resiliently acting harrow having a working depth adjusted so as not to exceed 10 cm.

6. The improved method of claim 5, wherein the working depth of the harrow is adjusted to about 5 cm.

* * * * *